United States Patent
Jordan, IV et al.

(10) Patent No.: US 6,933,269 B2
(45) Date of Patent: Aug. 23, 2005

(54) POLYASPARTATE DERIVATIVES FOR USE IN DETERGENT COMPOSITIONS

(75) Inventors: Glenn Thomas Jordan, IV, Indian Springs, OH (US); Eugene Paul Gosselink, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 275 days.

(21) Appl. No.: 10/210,376

(22) Filed: Jul. 31, 2002

(65) Prior Publication Data

US 2003/0069153 A1 Apr. 10, 2003

Related U.S. Application Data

(60) Provisional application No. 60/310,295, filed on Aug. 3, 2001.

(51) Int. Cl.[7] .............................. C11D 3/20; C11D 3/26; C11D 3/37
(52) U.S. Cl. ..................... 510/480; 510/336; 510/337; 510/476; 510/477; 510/488; 510/499; 510/500; 560/158; 548/533
(58) Field of Search ................................ 510/336, 337, 510/361, 476, 477, 480, 488, 499, 500; 560/158; 548/533

(56) References Cited

U.S. PATENT DOCUMENTS

| | | | |
|---|---|---|---|
| 5,288,431 A | 2/1994 | Huber et al. | |
| 5,458,809 A | 10/1995 | Fredj et al. | |
| 5,458,810 A | 10/1995 | Fredj et al. | |
| 5,460,752 A | 10/1995 | Fredj et al. | |
| 5,466,802 A | 11/1995 | Panandiker et al. | |
| 5,470,507 A | 11/1995 | Fredj et al. | |
| 5,478,489 A | 12/1995 | Fredj et al. | |
| 5,484,860 A * | 1/1996 | Wood et al. | 525/432 |
| 5,486,303 A | 1/1996 | Capeci et al. | |
| 5,489,392 A | 2/1996 | Capeci et al. | |
| 5,494,995 A * | 2/1996 | Wood et al. | 528/328 |
| 5,516,448 A | 5/1996 | Capeci et al. | |
| 5,565,145 A | 10/1996 | Watson et al. | |
| 5,565,422 A | 10/1996 | Del Greco et al. | |
| 5,569,645 A | 10/1996 | Dinniwell et al. | |
| 5,574,005 A | 11/1996 | Welch et al. | |
| 5,679,630 A | 10/1997 | Baeck et al. | |
| 5,691,297 A | 11/1997 | Nassano et al. | |
| 5,981,691 A * | 11/1999 | Sikes | 528/328 |
| 6,300,504 B1 * | 10/2001 | Guth et al. | 548/547 |
| 6,696,401 B1 * | 2/2004 | Gosselink et al. | 510/303 |
| 2002/0161171 A1 * | 10/2002 | Sikes et al. | 528/363 |

* cited by examiner

*Primary Examiner*—Gregory R. Del Cotto
(74) *Attorney, Agent, or Firm*—Laura R. Grunzinger; Kim William Zerby; Steven W. Miller

(57) ABSTRACT

Polyaspartate derivatives, especially hydrophobically modified and/or hydrophilically modified polyaspartate derivatives, most especially polyaspartate derivatives that are both hydrophilically and hydrophobically modified, for use in detergent compositions, specifically laundry detergent compositions for providing cleaning, dispersancy, especially soil dispersion, builder properties and/or improved whitening of fabrics contacted by such detergent compositions; and methods for making such polyaspartate derivatives, and methods and articles employing such detergent compositions, are provided.

13 Claims, No Drawings

POLYASPARTATE DERIVATIVES FOR USE IN DETERGENT COMPOSITIONS

RELATED APPLICATIONS

This application claims priority to U.S. Provisional Application Ser. No. 60/310,295 filed Aug. 3, 2001.

FIELD OF THE INVENTION

The present invention relates to polyaspartate derivatives, especially hydrophobically modified and/or hydrophilically modified polyaspartate derivatives, most especially polyaspartate derivatives that are both hydrophilically and hydrophobically modified, for use in detergent compositions, specifically laundry detergent compositions for providing cleaning, dispersancy, especially soil dispersion, builder properties and/or improved whitening of fabrics contacted by such detergent compositions; and methods for making such polyaspartate derivatives, and methods and articles employing such detergent compositions.

BACKGROUND OF THE INVENTION

Polyaspartate materials have been used in the past as additives in detergents and cleaning compositions. However, conventional polyaspartate materials have had problems with respect to formulatability, biodegradability and/or performance, especially toward hydrophobic particulate soils.

Accordingly, there is a need for a polyaspartate material that can be used in detergent and/or cleaning compositions that has improved formulatability as well as improved performance, especially toward hydrophobic particulate soils and that provides good biodegradability.

SUMMARY OF THE INVENTION

The present invention fulfills the needs described above by providing polyaspartate derivatives that have improved formulatability and improved detergent composition performance as compared to conventional polyaspartate materials as well as providing good biodegradability.

It has been surprisingly found that the polyaspartate derivatives of the present invention provide improved fabric whiteness appearance and/or improved soil-release of stains from fabric and/or better dispersancy of particulate soils, especially hydrophobic particulate soils during the wash (e.g., small hydrophobic particles that readily deposit onto fabric during a laundry process; nonlimiting examples include: lime soap, surfactant complexed with calcium, calcium carbonate, carbon black, hydrophobic dispersed dyes and pigments, clay mixed with body lipid) and/or good sequestration of metal ions (e.g., $Fe^{3+}$, $Cu^{2+}$), and/or good cleaning/bleaching of pigmented soils (e.g., beverage stains, fabric dyes). Moreover, polymers of this type have good biodegradability and can be used in heavy duty liquid detergent applications without significantly increasing product viscosity.

Additionally, depending on the structures of the polyaspartate derivatives, the polyaspartate derivatives of the present invention may perform in other manners. For example, if a polyaspartate derivative retains some succinimide or polysuccinimide function, then the polyaspartate derivative could exhibit bleach activating properties when hydrogen peroxide or a source of hydrogen peroxide is present.

In one aspect of the present invention, a polyaspartate derivative comprising at least one aspartamide moiety and at least one of the following moieties: aspartate and/or succinimide, is provided.

In another aspect of the present invention, a method for making a polyaspartate derivative comprising the step of mixing a polysuccinimide or a source of polysuccinimide with a primary or secondary amine material that is hydrophobic or that can subsequently be modified to be hydrophobic and/or a primary or secondary amine material that is hydrophilic or that can subsequently be modified to be hydrophilic to produce a polyaspartate derivative that can be either a hydrophobically modified polyaspartate derivative, a hydrophilically modified polyaspartate derivative or a hydrophobically and hydrophilically modified polyaspartate derivative, is provided.

In yet another aspect of the present invention, a detergent composition comprising a polyaspartate derivative, is provided.

In still yet another aspect of the present invention, a method for treating a fabric article comprising contacting the fabric article with a polyaspartate derivative such that the fabric article is treated, is provided.

Accordingly, the present invention provides polyaspartate derivatives, methods for making polyaspartate derivatives, detergent compositions comprising polyaspartate derivatives, and methods for treating fabric articles employing polyaspartate derivatives.

DETAILED DESCRIPTION OF THE INVENTION

Polyaspartate Derivative

A polyaspartate derivative in accordance with the present invention comprises at least one aspartamide moiety, preferably a polyaspartamide, and at least one of the following moieties: aspartate and/or succinimide, preferably a polyaspartate and/or a polysuccinimide. Additional moieties can be incorporated into the polyaspartate derivative. Nonlimiting examples of such additional moieties include diamines, diacids and amino acids.

The polyaspartate derivatives of the present invention may have any molecular weight, preferably less than 100,000, more preferably a molecular weight of from about 100,000 to about 500, even more preferably a molecular weight of from about 75,000 to about 600, yet even more preferably a molecular weight of from about 50,000 to about 1,000, still even more preferably a molecular weight of from about 20,000 to about 1,000.

In one embodiment, the polyaspartate derivative has the formula:

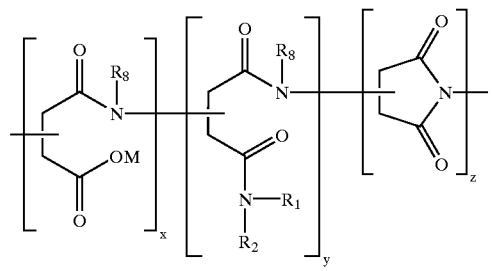

wherein:
x+y+z have values such that the sum ranges from 4 to 730 and y is at least 1;
M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the group same group as defined for $R_1$ and $R_2$, $R_5$, $R_6$ and $R_7$ are selected from the group consisting of H, $C_1$–$C_{18}$ alkyl, $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together, a nonlimiting example of such a cyclic group would be —$(CH_2)_5$— or —$(CH_2)_2$—O—$(CH_2)_2$— group; and $R_8$ is selected from the same group defined for $R_1$ & $R_2$, is provided.

The preferred values for x+y+z would range from 7 to 145. It is preferred that at least one of the $R_1$ and $R_2$, groups would be H and that the other group would preferably be non-hydrogen. For the non-hydrogen group, $R_1$ and $R_2$ is preferably: $C_{4-18}$ linear or branched alkyl, $C_{3-18}$ unsaturated alkyl, $C_{6-10}$ aryl, $C_{7-14}$ arakyl or alkaryl, —$((CH_2)_{1-3}O)_{0-1}$—$(CH_2CH(R_3)O)_{1-35}$—$R_4$, or —$((CH_2)_{1-3}O)_{0-1}$—$(CH(R_3)CH_2O)_{1-35}$—$R_4$ where $R_3$ is preferably H or $CH_3$ and where $R_4$ is preferably H or $C_{1-18}$ alkyl $C_{7-14}$ arakyl or alkaryl, sulfoalkyl, disulfoalkyl, or alkyl substituted with both sulfonate and sulfinate groups. Most preferred is where $R_4$ is H or $CH_3$. In another embodiment, where $R_1$ or $R_2$ is —$(CH_2)_{1-18}$—$(OCH_2CH(R_3))_{0-40}$—$NR_5R_6$ or —$(CH_2)_{1-18}$—$(OCH_2CH(R_3))_{0-40}$—$NR_5R_6R_7$, it is preferred that $R_5$, $R_6$ and $R_7$ would be H, $C_{1-18}$ alkyl, $C_{7-14}$ arakyl or alkaryl, sulfoalkyl, disulfoalkyl, or alkyl substituted with both sulfonate and sulfinate groups. It is also preferable that $R_8$ would be H, $C_{1-4}$ alkyl, or $C_{2-4}$ hydroxy alkyl.

In a second embodiment, the polyaspartate derivative of the present invention has the formula:

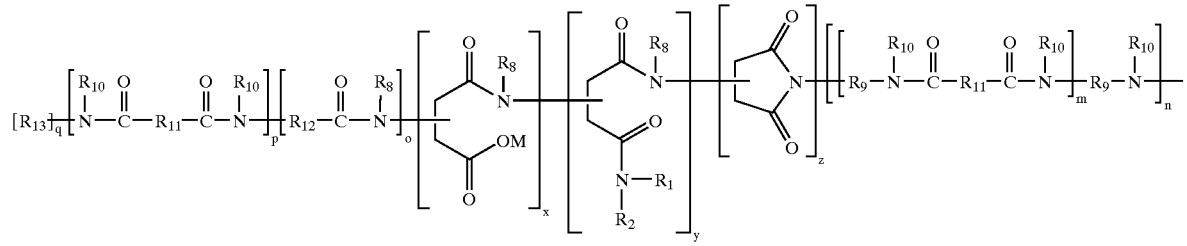

wherein:

x+y+z+m+n+o+p+q have values such that the sum ranges from 4 to 730 and y is at least 1 and p is limited to 0 or 1; furthermore, when p is 0, then q is 0;

M, $R_1$, $R_2$ and $R_8$ are defined as above;

$R_9$ and $R_{11}$ are independently selected from substituted, preferably hydroxy- or carboxy-substituted, or unsubstituted, linear and branched $C_1$–$C_{16}$ alkylene, and/or, $C_6$–$C_{10}$ arylene, $C_7$–$C_{12}$ alkarylene and polyoxyalkylene;

$R_{10}$ is selected from H, $C_1$–$C_6$ alkyl, $C_2$–$C_6$ hydroxyalkyl;

$R_{12}$ is selected from $C_1$–$C_{12}$ alkylene, carboxy substituted $C_3$–$C_{10}$ alkylene;

$R_{13}$ is:

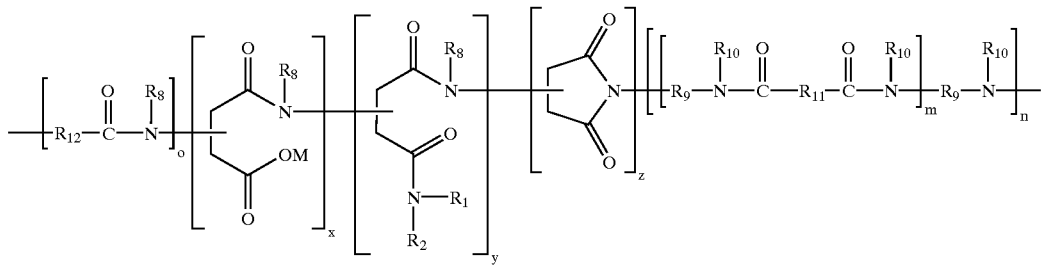

wherein $R_1$, $R_2$, $R_8$, $R_9$, $R_{10}$, $R_{11}$, $R_{12}$ and m, n, o, x, y and z are as described above.

In addition to the preferred embodiments described above for $R_1$, $R_2$, $R_3$, $R_4$, $R_5$, $R_6$, $R_7$, and $R_8$, it is preferred that $R_9$ and $R_{11}$ would be $C_{1-12}$ alkylene, $C_{6-10}$ arylene, $C_{8-12}$ alkarylene, or polyoxyalkylene with a MW below 3000. $R_{10}$ is preferably H or $CH_3$ and $R_{12}$ is $C_{1-6}$ alkyene or carboxyl $C_{3-10}$ alkylene.

In another embodiment, the polyaspartate derivative may be in the form of a cross-linked oligomer or polymer, preferably having the formula:

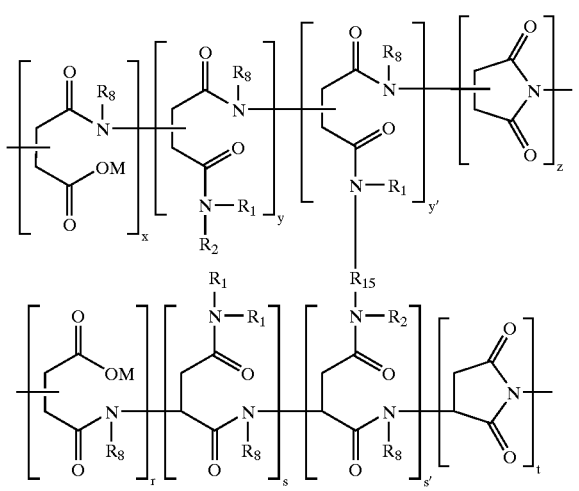

wherein:

x+y+y'+z and r+s+s'+t have values such that the sum ranges from 4 to 730 and y' and s' are $\geq 1$;

M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the same group as defined for $R_1$ and $R_2$, $R_5$, $R_6$ and $R_7$ are selected from the group consisting of H, $C_1$–$C_{18}$ alkyl, $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together, a nonlimiting example of such a cyclic group would be —$(CH_2)_5$— or —$(CH_2)_2$—O—$(CH_2)_2$— group;

$R_8$ is selected from the same group defined for $R_1$ & $R_2$; and $R_{15}$ is selected from the group consisting of $C_1$–$C_{18}$ alkylene, $C_6$–$C_{12}$ arylene, —$(CH_2)_{1-18}$—$O(CH_2CH(R_3)O)_{1-50}$—$(CH_2)_{1-18}$—, —$(CH_2CH(R_3)O)_{1-50}$—$(CH_2CH(R_3))$—, and —$(CH(R_3)CH_2O)_{1-50}$—$(CH_2CH(R_3))$ where $R_3$ is H or $C_1$–$C_4$ alkyl.

In addition to the preferred embodiments described above for $R_1$, $R_2$, $R_3$, $R_4$, $R_5$, $R_6$, $R_6$, and $R_8$, it is preferred that $R_{15}$ would be $C_{1-12}$ alkylene, —$(CH_2)_{2-5}$—$O(CH_2CH(R_3)O)_{1-30}$—$(CH_2)_{2-5}$—, —$(CH_2CH(R_3)O)_{1-30}$—$(CH_2CH(R_3))$— or —$(CH(R_3)CH_2O)_{1-30}$—$(CH_2CH(R_3))$ where $R_3$ is H or $CH_3$ In still yet another embodiment, the polyaspartate derivative of the present invention is in the form of a cross-linked oligomer or polymer having the formula:

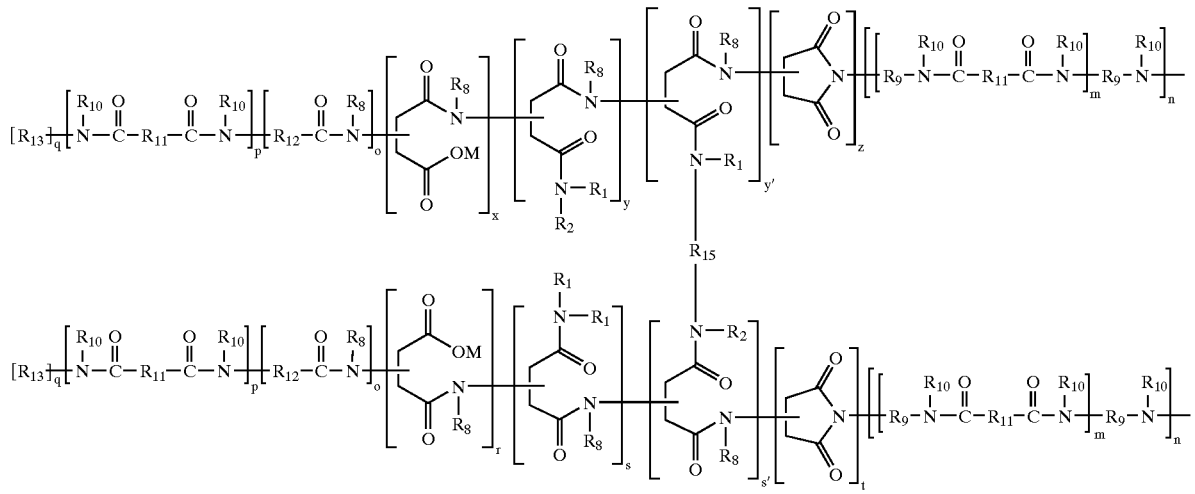

wherein all variables, except for $R_{13}$ are defined as above.

$R_{13}$ is:

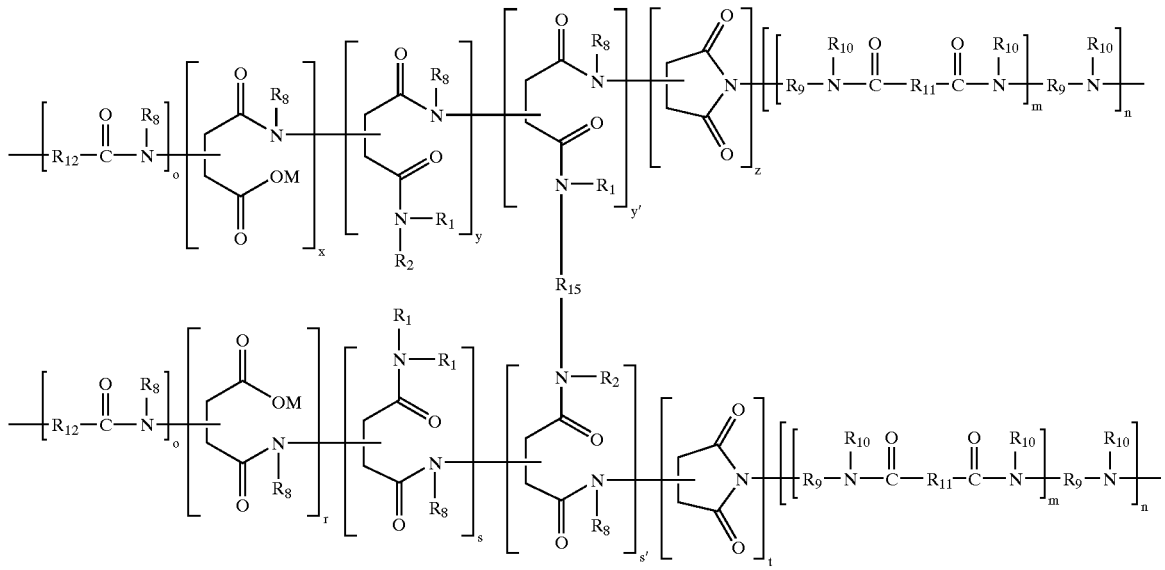

When the polyaspartate derivatives are in the form of cross-linked oligomers and/or polymers, the level of crosslinking is not sufficient to result in formation of an insoluble polymer. The level of crosslinking suitable for the polyaspartate derivatives is dependent on the molecular weight of the cross-linked polyaspartate derivatives because as is known in the art, the frequency of crosslinks (relative to total repeat units) needed to give insoluble materials decreases as the molecular weight increases. Without desiring to be bound by theory, one crosslink per original polymer molecule could give dimers and two crosslinks per original polymer molecule could give a completely linked structure that was not really crosslinked. Any higher level than two per molecule could theoretically start producing true crosslinking and thus loss of solubility. Accordingly, the cross-linked polyaspartate derivatives of the present invention preferably have less than two crosslinks for each polysuccinimide molecule prior to modification. Alternatively, on the basis of solubility, the cross-linked polyaspartate derivatives of the present invention include levels of crosslinking that permit at least 50% of the cross-linked polyaspartate derivative to dissolve when 1 gram of cross-linked polyaspartate derivative is placed in a well stirred, 100 ml portion of pH 9-buffered water at room temperature and the temperature is raised gradually to 60° C. over one hour and held there for one additional hour.

For each of the structures listed above, the polyaspartate derivatives may contain cyclic polymers that do not have end groups, but for the most part, the end groups will be those which are either the "natural" polyaspartate end groups, i.e. amino, and carboxylate or dicarboxylate, or end groups formally resulting from reaction of the "normal" end groups with other monoreactive "capping" monomers. This includes amides formed from the normal amino end group reacting with either hydrophobic or hydrophilic monocarboxylates, including, but not limited to oleic acid, benzoic acid, 2-ethylhexanoic acid, and ethoxylated mono-carboxylates such as $CH_3(OCH_2CH_2)_nOCH_2COOH$. It also includes amides or imides formed from the normal carboxylate or dicarboxylate ends reacting with either hydrophilic or hydrophobic primary or secondary monoamines including, but not limited to oleylamine, dodecylamine, benzylamine, and ethoxylated primary or secondary amines such as the Jeffamine M series (Huntsman) and $CH_3NH(CH_2CH_2O)_nCH_3$.

Any known technique, for example, solution (aqueous or solvent), emulsion, solvent-exchange or suspension polymerization and/or post-polymerization modifications may be used in the making of the polyaspartate derivatives of the present invention. The polymerization reactions can be conducted as cofeed, heel, semi-continuous or continuous processes. The polyaspartate derivatives may be random or block polymers depending upon the specific method used to conduct the polymerization. The polyaspartate derivatives may be used in solution form, for example as aqueous or organic solvent solutions, or they may be isolated as solid materials, for example by spray drying, and used in the form of granules or particulates.

SYNTHESIS EXAMPLES

The following synthesis examples illustrate nonlimiting examples of processes to make the polyaspartate derivatives of the present invention or precursors thereof.

I. Preparation of Polysuccinimide a. Preparation of Polysuccinimide in Propylene Carbonate Into a stirred reactor flask, equipped with a magnetic stirring bar, a thermometer, a water removal condenser, and a port for introducing anhydrous nitrogen gas, is placed propylene carbonate (15 g, 0.147 mol, Aldrich). Then, phosphoric acid (3 g, 85%, 0.026 mole, Aldrich) is added and L-aspartic acid (3 g, 0.0225 mol, Aldrich) is added with stirring. Nitrogen gas flow through the flask is begun and the temperature of the reaction mixture is raised to about 180° C. and maintained there with continued stirring for about 2 hours. A homogeneous reaction mixture forms. At this point, the reaction mixture is cooled to room temperature and the product is triturated with about 250 ml of acetone. The precipitate is collected by filtration and then washed with water and further with acetone. The resulting solid is dried under vacuum at about 60° C. for about an hour to give the desired polysuccinimide.

b. Preparation of Polysuccinimide without Solvent

Into a 1-liter round bottom flask are placed L-aspartic acid (133.1 g, 1 mol, Aldrich) and 85% phosphoric acid (70.0 g, 0.61 mol, Aldrich. The flask is placed on a vacuum evaporator and heated to 140° C. in 3 hours under a reduced pressure of 200 mmHg with constant rotation as it gradually converts to a lump. Then, the temperature is raised 185° C. over 3 hours, during which time the lump becomes a solid. Then, the solid is subjected to a reaction at 185 to 195° C. for 10 hours under a reduced pressure of 5 mmHg, cooled to room temperature, and then ground it to recover crude polysuccinimide as a powder. Next, the powder and 300 g of isopropyl alcohol are stirred in a reactor heated at 80° C. for 1 hour to extract phosphoric acid. Then, the mixture is cooled to room temperature and the solid is collected on a filter and was washed with 100 g of IPA. This extraction and washing operation are repeated 10 times. The resulting material is dried to obtain 96.9 g of the desired polysuccinimide.

II. Preparation of Polyaspartate Derivative a. Preparation of Polyaspartate Modified with Both Hydrophilic and Hydrophobic Groups A 9.7 g (0.10 equiv.) portion of polysuccinimide is dissolved in 30 g of dimethyl formamide and then Jeffamine M-2070 (10 g, 0.005 mol, alkoxylated monoamine) is added along with benzylamine (2.14 g, 0.02 mol) and the mixture is stirred as the temperature is raised to 60C and held there for about 18 hours. The DMF solvent is removed on a kugelrohr at 80° C. and 1 mmHg. The residue is taken into 50 ml of water and 6.4 g (0.08 mol) of 50% NaOH solution is added gradually with stirring. The system is allowed to stir at room temperature for 24 hours and is then adjusted to pH 8 with dilute hydrochloric acid. The solution is freeze dried to give the desired modified polyaspartate having both benzylamide and alkoxylated amide pendant groups.

b. Preparation of a Polyaspartate Derivative in which Polysuccinimide is not Isolated and Water is Used as a Solvent A mixture of L-aspartic acid (13.3 g, 0.1 mol, Aldrich), benzylamine (1.07 g, 0.01 mol, Aldrich), ethoxyethoxyethoxypropylamine (1.91 g 0.01 mole, Chem. Service, Inc.) 85% phosphoric acid (1.76 g, 0.015 mol) and water (18 g, 1 mol) are placed in an open glass liner in a rocking autoclave, and placed under 1000 psi nitrogen gas. The pressurized nitrogen is released and then the system is repressurized to 1000 psi and heated to 180° C. The temperature is maintained for 90 minutes and then lowered to room temperature. The pressure is cautiously reduced to atmospheric pressure. The contents of the liner are removed using a water wash. The pH of the system is adjusted to 9 by addition of sodium hydroxide under good stirring. The resulting solution is freeze dried to give a water soluble polyaspartate having both hydrophilic and hydrophobic pendant groups.

c. Preparation of a Water Soluble Polyaspartate Derivative with Residual Succinimide Groups A 9.7 g (0.10 equiv.) portion of polysuccinimide is dissolved in 30 g of dimethyl formamide and then Jeffamine M-2070 (10 g, 0.005 mol, alkoxylated monoamine) is added along with benzylamine (2.14 g, 0.02 mol) and the mixture is stirred as the temperature is raised to 60C and held there for about 18 hours. The DMF solvent is removed on a kugelrohr at 80° C. and 1 mmHg. The residue is taken into 50 ml of water and 3.2 g (0.04 mol) of 50% NaOH solution is added gradually with stirring. The system is allowed to stir at room temperature for 24 hours and is then adjusted to pH 7.5 with dilute hydrochloric acid. The solution is freeze dried to give the desired modified polyaspartate having benzylamide and alkoxylated amide pendant groups as well as residual succinimide groups.

d. Preparation of a Water Soluble or Dispersible Polyaspartate Derivative with Initial Cationic Character and Residual Succinimide Groups A 9.7 g (0.10 equiv.) portion of polysuccinimide is dissolved in 30 g of dimethyl formamide and then 3-dimethylaminopropylamine (3.06 g, 0.03 mole) is added and the mixture is stirred as the temperature is raised to 60° C. and held there for about 3 hours. The solution is then cooled to room temperature and excess methyl bromide is slowly bubbled into the solution through a fritted inlet tube. Next, the DMF solvent is stripped off on a kugelrohr apparatus at 80C and 1.0 mmHg to give a mostly water soluble, cationic polyaspartate derivative with trimethylammoniopropylamido pendant groups and residual succinimide groups.

e. Preparation of a Partially Crosslinked Polyaspartate Modified with Both Hydrophilic and Hydrophobic Groups A 9.7 g (0.10 equiv.) portion of polysuccinimide is dissolved in 30 g of dimethyl formamide and then Jeffamine M-2070 (10 g, 0.005 mol, alkoxylated monoamine) is added along with benzylamine (2.14 g, 0.02 mol) and Jeffamine ED-2003 (2.1 g, 0.001 mol, Huntsman alkoxylated diamine) the mixture is stirred as the temperature is raised to 60C and held there for about 18 hours. The DMF solvent is removed on a kugelrohr at 80° C. and 1 mmHg. The residue is taken into 50 ml of water and 6.4 g (0.08 mol) of 50% NaOH solution is added gradually with stirring. The system is allowed to stir at room temperature for 24 hours and is then adjusted to pH 8 with dilute hydrochloric acid. The nearly clear solution is freeze dried to give the desired lightly crosslinked, modified polyaspartate having both benzylamide and alkoxylated amide pendant groups.

Laundry Detergent Composition

The polyaspartate derivative of the present invention is preferably incorporated with one or more additional adjunct ingredients into one or more laundry detergent compositions. These one or more additional adjunct ingredients are determined according to the type of composition that the polyaspartate derivative is to be incorporated into and/or the type of use of the laundry detergent composition.

The polyaspartate derivative can be incorporated into a range of different compositions and/or products including, but not limited to, heavy duty detergent compositions, fabric care compositions (excluding fabric conditioners) and dryer-added compositions. These compositions and/or products may be in any form known to those skilled in the art. For examples, the compositions and/or products may be in liquid, granular, powder, tablet, paste, foam and bars. These compositions and/or products may be neat or releasably absorbed or adsorbed on to a substrate, such as a woven or non-woven filament substrate.

A preferred laundry detergent composition of the present invention comprises:

(a) a surfactant, preferably from about 1% to about 80% by wt of at least one anionic, nonionic, cationic, ampholytic, or zwitterionic surfactant and mixtures thereof;

(b) a polyaspartate derivative, preferably from about 0.001% to about 50%, more preferably from about 0.005% to about 20%, even more preferably from about 0.01% to about 10% by wt of a polyaspartate derivative; and (c) optionally, the balance adjunct ingredients.

Adjunct Ingredients

In addition to the polyaspartate derivative, one or more adjunct ingredients may optionally, but preferably, be included in the compositions, products and/or systems comprising the polyaspartate derivative.

Examples of suitable adjunct ingredients include, but are not limited to, surfactants, builders, bleaches, bleach activators, bleach catalysts, enzymes, enzyme stabilizing systems, chelants, optical brighteners, soil release polymers, dye transfer agents, dispersants, suds suppressors, dyes, perfumes, colorants, filler salts, hydrotropes, photoactivators, fluorescers, fabric conditioners, preservatives, anti-oxidants, anti-shrinkage agents, anti-wrinkle agents, anti-microbial agents, germicides, fungicides, color speckles, silvercare, anti-tarnish and/or anti-corrosion agents, alkalinity sources, solubilizing agents, carriers, processing aids, pigments and pH control agents as described in U.S. Pat. Nos. 5,705,464, 5,710,115, 5,698,504, 5,695,679, 5,686,014 and 5,646,101. Specific cleaning adjunct materials are exemplified in detail hereinafter.

Methods of the Present Invention

A method for treating a fabric (i.e., removing stains, whitening) comprising contacting the fabric with laundry detergent composition in accordance with the present invention, such that fabric is treated.

Treated Fabric

A treated fabric results from the methods of the present invention.

Product/Instructions of Use

This invention also may encompass the inclusion of instructions on the use of the laundry detergent compositions described herein with the packages containing the laundry detergent compositions or with other forms of advertising associated with the sale or use of the laundry detergent compositions. The instructions may be included in any manner typically used by consumer product manufacturing or supply companies. Examples include providing instructions on a label attached to the container holding the system and/or composition; on a sheet either attached to the container or accompanying it when purchased; or in advertisements, demonstrations, and/or other written or oral instructions which may be connected to the purchase or use of the laundry detergent compositions.

Specifically the instructions will include a description of the use of the laundry detergent composition. The instructions, for instance, may additionally include information relating to the recommended amount of laundry detergent composition to apply to the fabric, if soaking or rubbing is appropriate to the fabric; the recommended amount of water, if any, to apply to the fabric before and after treatment; other recommended treatment.

The laundry detergent composition may be incorporated into a product, the product may be a kit comprising the laundry detergent composition. Accordingly, a product comprising a laundry detergent composition of the present invention, the product further including instructions for using the laundry detergent composition to treat a fabric in need of treatment.

Nonlimiting examples of suitable products and/or compositions in which the polyaspartate derivatives may be used may be in any product form known to those of ordinary skill in the art, such as granules, powder, paste, foam, tablets, dimple tablets, bars, sprays, liquids, dryer-added forms, impregnated sheets, coated sheets, gels, etc. The products and/or compositions in which the polyaspartate derivatives may be used include, but are not limited to, heavy duty liquid compositions (TIDE commercially available from The Procter & Gamble Company), heavy duty granule or powder compositions (i.e., TIDE commercially available from The Procter & Gamble Company), fabric treatment compositions (i.e., DRYEL commercially available from The Procter & Gamble Company) and fabric care compositions, other than fabric conditioners.

FORMULATION EXAMPLES

Example 1

Several heavy duty granular laundry and/or fabric care compositions (excluding fabric conditioners) are prepared containing various polyaspartate derivatives in accordance with the present invention. These granular laundry and/or fabric care compositions (excluding fabric conditioners) all have the following basic formula:

TABLE A

| Component | Wt. % |
| --- | --- |
| $C_{12}$ Linear alkyl benzene sulfonate | 9.31 |
| $C_{14-15}$ alkyl ether (0.35 EO) sulfate | 12.74 |
| Zeolite Builder | 27.79 |
| Sodium Carbonate | 27.31 |
| PEG 4000 | 1.60 |
| Dispersant | 2.26 |
| $C_{12-13}$ Alcohol Ethoxylate (9 EO) | 1.5 |
| Sodium Perborate | 1.03 |
| Soil Release Polymer | 0.41 |
| Enzymes | 0.59 |
| Polyaspartate Derivative | 3.0 |
| Perfume, Brightener, Suds Suppressor, Other Minors, Moisture, Sulfate | Balance |
|  | 100% |

Example 2

A heavy duty aqueous liquid detergent composition in accordance with the present invention is prepared in a dual-compartment container as follows (the dual compartment container is designed to deliver preferably a 4:1 weight ratio of the first compartment product vs the second compartment product):

| First Compartment | |
| --- | --- |
| MEA | 1.10 |
| C10 APA | 0.50 |
| Na C25AE1.80S | 19.35 |
| Propylene Glycol | 7.50 |
| Neodol 23-9 | 0.63 |
| FWA-15 | 0.15 |
| Na Toluene Sulfonate | 2.25 |
| NaOH | 2.79 |
| N-Cocoyl N-Methyl Glucamine | 2.50 |
| Citric Acid | 3.00 |
| C12–16 Real Soap | 2.00 |
| Borax Premix | 2.50 |
| EtOH | 3.25 |
| Ca Formate | 0.09 |
| Polyethyleneimine (MW 600) ethoxylated and average of 20 times per nitrogen | 1.30 |
| Ethoxylated Tetraethylene-Pentaimine | 0.60 |
| Na Formate | 0.115 |
| Fumed Silica Premix | 0.0015 |
| Soil Release Polymer | 0.08 |
| Blue Liquitint 65 | 0.016 |
| Protease | 1.24 |
| Cellulase | 0.043 |

-continued

| | |
|---|---|
| Amylase | 0.15 |
| Silicone | 0.119 |
| Neptune LC | 0.35 |
| DTPA | 0.30 |
| Sodium Bicarbonate (Effervescent agent) | 3.00 |
| Polyaspartate Derivative | 0.5 |
| Water | balance |
| Second Compartment | |
| Phthaloylamino peroxycaproic acid (PAP) | 22.5 |
| Citric Acid (Acid agent) | 5.0 |
| Xanthan Gum | 0.4 |
| Water | balance |

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

The compositions of the present invention can be suitably prepared by any process chosen by the formulator, non-limiting examples of which are described in U.S. Pat. No. 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996 all of which are incorporated herein by reference.

In addition to the above examples, the cleaning compositions of the present invention can be formulated into any suitable laundry detergent composition, non-limiting examples of which are described in U.S. Pat. No. 5,679,630 Baeck et al., issued Oct. 21, 1997; U.S. Pat. No. 5,565,145 Watson et al., issued Oct. 15, 1996; U.S. Pat. No. 5,478,489 Fredj et al., issued Dec. 26, 1995; U.S. Pat. No. 5,470,507 Fredj et al., issued Nov. 28, 1995; U.S. Pat. No. 5,466,802 Panandiker et al., issued Nov. 14, 1995; U.S. Pat. No. 5,460,752 Fredj et al., issued Oct. 24, 1995; U.S. Pat. No. 5,458,810 Fredj et al., issued Oct. 17, 1995; U.S. Pat. No. 5,458,809 Fredj et al., issued Oct. 17, 1995; U.S. Pat. No. 5,288,431 Huber et al., issued Feb. 22, 1994 all of which are incorporated herein by reference.

Having described the invention in detail with reference to preferred embodiments and the examples, it will be clear to those skilled in the art that various changes and modifications may be made without departing from the scope of the invention and the invention is not to be considered limited to what is described in the specification.

What is claimed is:

1. A polyaspartate derivative wherein said polyaspartate derivative has the formula:

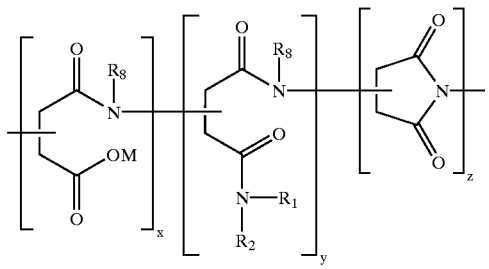

wherein:

x+y+z have values such that the sum ranges from 4 to 730 and y is at least 1;

M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the same group as defined for $R_1$ and $R_2$, $R_5$, $R_6$ and $R_7$ are selected from the group consisting of H, $C_1$–$C_{18}$ alkyl, $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together selected from —$(CH_2)_5$— or —$(CH_2)_2$—O—$(CH_2)_2$— group; and $R_8$ is selected from the same group defined for $R_1$ & $R_2$; wherein $R_1$, $R_2$ and $R_4$ are selected such that at least one hydrophobic and at least one hydrophilic moiety are present in the polyaspartate derivative.

2. The polyaspartate derivative according to claim 1 wherein said polyaspartate derivative has the formula:

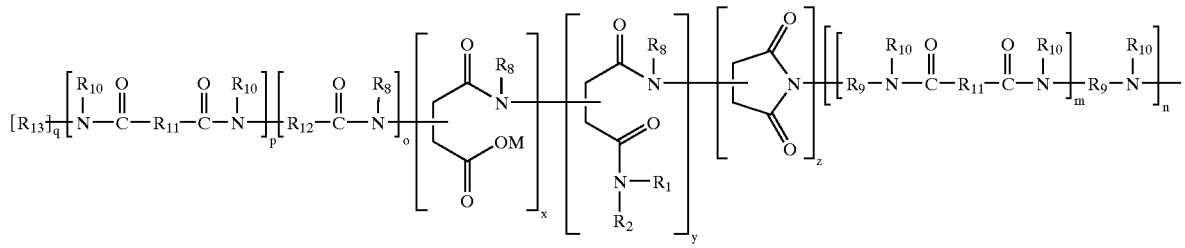

wherein:

x+y+z+m+n+o+p+q have values such that the sum ranges from 4 to 730 and y is at least 1 and p is limited to 0 or 1; furthermore, when p is 0, then q is 0;

M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the same group as defined for $R_1$ and $R_2$, $R_5$, $R_6$ and $R_7$ are selected from the group consisting of H, $C_1$–$C_{18}$ alkyl $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together, selected from —$(CH_2)_5$— or —$(CH_2)_2$—O—$(CH_2)_2$— group;

$R_8$ is selected from the same group defined for $R_1$ & $R_2$;

$R_9$ and $R_{11}$ are independently selected from substituted, preferably hydroxy- or carboxy-substituted, or unsubstituted, linear and branched $C_1$–$C_{16}$ alkylene, and/or, $C_6$–$C_{10}$ arylene, $C_7$–$C_{12}$ alkarylene and polyoxyalkylene;

$R_{10}$ are present from H, $C_1$–$C_6$ alkyl, $C_2$–$C_6$ hydroxyalkyl;

$R_{12}$ is selected from $C_1$–$C_{12}$ alkylene, carboxy substituted $C_3$–$C_{10}$ alkylene;

$R_{13}$ is:

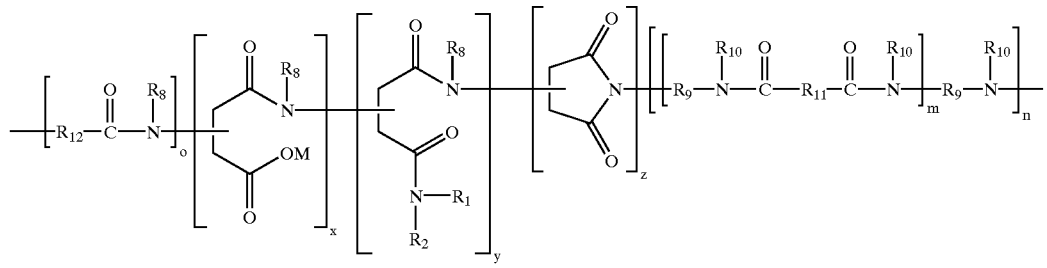

wherein $R_1$, $R_2$, $R_8$, $R_9$, $R_{10}$, $R_{11}$, $R_{12}$ and m, n, o, x, y and z are as described above; wherein $R_1$, $R_2$ and $R_6$ are selected such that at least one hydrophobic and at least one hydrophilic moiety is selected in the polyaspartate derivative.

3. The polyaspartate derivative according to claim 1 wherein said polyaspartate derivative is in the form of a cross-linked oligomer or polymer having the formula:

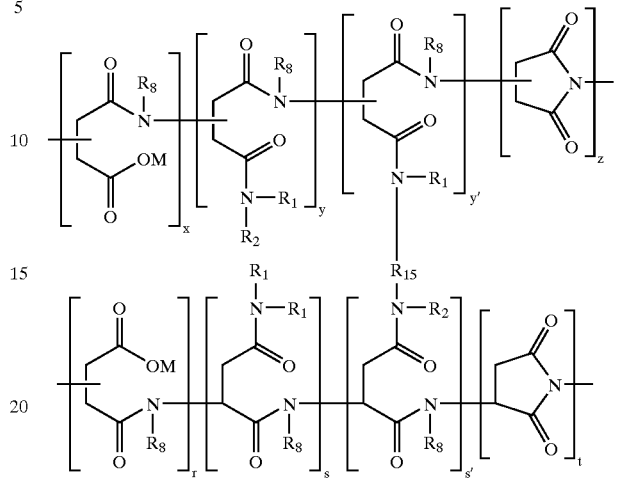

wherein:

x+y+y'+z and r+s+s'+t have values such that the sum ranges from 4 to 730 and y' and s' are ≧1;

M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the same group as defined for $R_1$ and $R_2$, $R_5$, $R_6$ and $R_7$ are selected from the group consisting of H, $C_1$–$C_{18}$ alkyl, $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together, selected from —$(CH_2)_5$— or —$(CH_2)_2$—O—$(CH_2)_2$— group;

$R_8$ is selected from the same group defined for $R_1$ & $R_2$; and $R_{15}$ is selected from the group consisting of $C_1$–$C_{18}$ alkylene, $C_6$–$C_{12}$ arylene, —$(CH_2)_{1-18}$—$O(CH_2CH(R_3)O)_{1-50}$—$(CH_2)_{1-18}$—, —$(CH_2CH(R_3)O)_{1-50}$—$(CH_2CH(R_3))$—, and —$(CH(R_3)CH_2O)_{1-50}$—$(CH_2CH(R_3))$ where $R_3$ is H or $C_1$–$C_4$ alkyl; wherein $R_1$, $R_2$ and $R_6$ are selected such that at least one hydrophobic and at least one hydrophilic moiety are present in the polyaspartate derivative.

4. The polyaspartate derivative according to claim 1 wherein said polyaspartate derivative is in the form of a cross-linked oligomer or polymer having the formula:

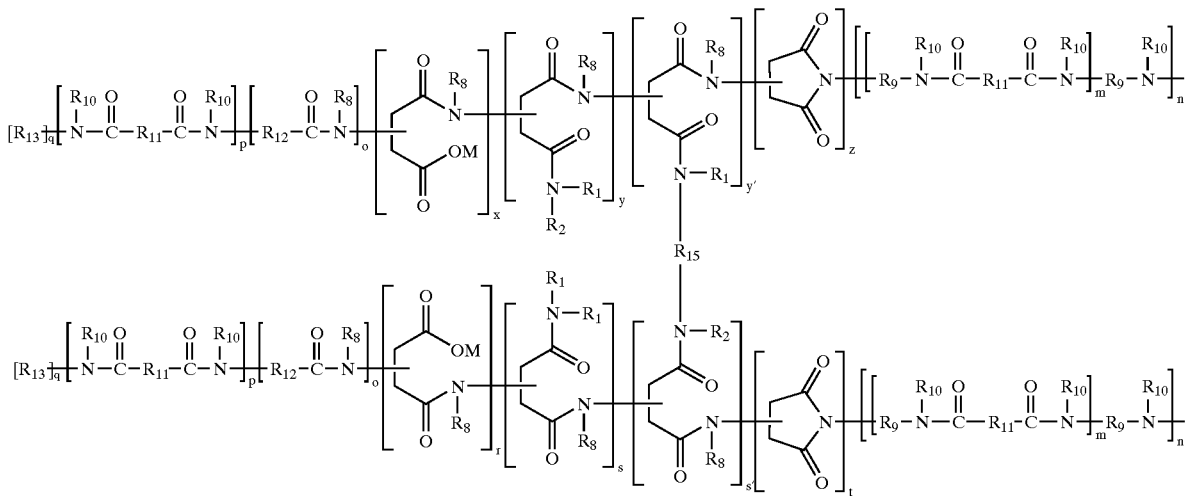

$x+y+y'+z+m+n+o+p+q+r+s+s'+t$ have values such that the sum ranges from 4 to 730 and $y'$ and $s'$ are at least 1 and p is limited to 0 or 1; furthermore, when p is 0, then q is 0;

M is an alkali metal, such as Na or K, or an ammonium cation;

$R_1$ and $R_2$ are independently selected from the group consisting of: H, $C_1$–$C_{22}$ linear or branched alkyl, $C_2$–$C_{22}$ unsaturated alkyl, $C_6$–$C_{12}$ aryl, $C_7$–$C_{24}$ aralkyl or alkaryl, saccharide, sulfoalkyl, disulfoalkyl, sulfoaryl, sulfinoalkyl, alkyl substituted with both sulfonate and sulfinate groups, —$((CH_2))_{1-18}O)_{0-1}$—$(CH_2CH(R_3)O)_{1-50}$—$R_4$; —$((CH_2)_{1-18}O)_{0-1}$—$(CH(R_3)CH_2O)_{1-50}$—$R_4$; —$(CH_2)_{1-18}$—$(OCH_2CH(R_3))_{0-40}$—$NR_5R_6$ and —$(CH_2)_{1-18}$—$(OCH_2CH(R_3))_{0-40}$—$NR_5R_6R_7$ where $R_3$ is H or $C_1$–$C_4$ alkyl, $R_4$ is selected from the same group as defined for $R_1$ and $R_2$, $R_5$, $R_6$ and $R_7$ are selected from the group consisting of H, $C_1$–$C_{18}$ alkyl, $C_6$–$C_{12}$ aryl, $C_7$–$C_{24}$ alkaryl or aralkyl, saccharide, sulfoalkyl, disulfoalkyl, sulfoaryl, sulfinoalkyl and alkyl substituted with both sulfonate and sulfinate groups; optionally, $R_1$ and $R_2$ can form a cyclic structure together, selected from —$(CH_2)_5$— or —$(CH_2)_2$—O—$(CH_2)_2$— group;

$R_8$ is selected from the same group defined for $R_1$ & $R_2$;

$R_9$ and $R_{11}$ are independently selected from substituted, preferably hydroxy- or carboxy-substituted, or unsubstituted, linear and branched $C_1$–$C_{16}$ alkylene, and/or, $C_6$–$C_{10}$ arylene, $C_7$–$C_{12}$ alkarylene and polyoxyalkylene;

$R_{10}$ is selected from H, $C_1$–$C_6$ alkyl, $C_2$–$C_6$ hydroxyalkyl;

$R_{12}$ is selected from $C_1$–$C_{12}$ alkylene, carboxy substituted $C_3$–$C_{10}$ alkylene;

$R_{15}$ is selected from the group consisting of $C_1$–$C_{18}$ alkylene, $C_6$–$C_{12}$ arylene, —$(CH_2)_{1-18}$—$O(CH_2CH(R_3)O)_{1-50}$—$(CH_2)_{1-18}$—, —$(CH_2CH(R_3)O)_{1-50}$—$(CH_2CH(R_3))$—, and —$(CH(R_3)CH_2O)_{1-50}$—$(CH_2CH(R_3))$ where $R_3$ is H or $C_1$–$C_4$ alkyl;

$R_{13}$ is:

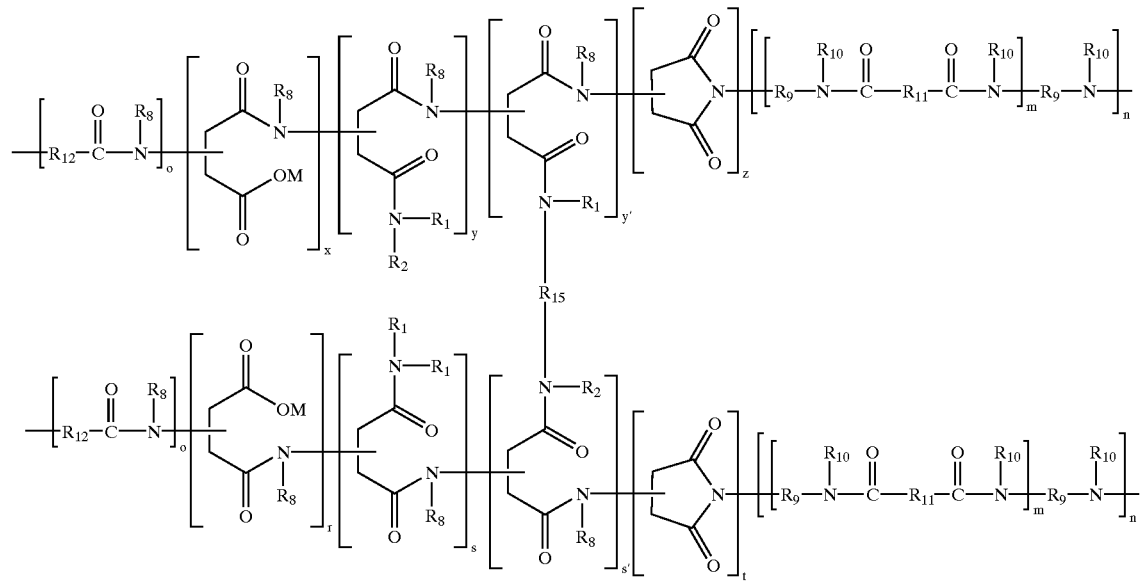

wherein $R_1$, $R_2$, $R_8$, $R_9$, $R_{10}$, $R_{11}$, $R_{12}$ and m, n, o, x, y and z are as described above; wherein $R_1$, $R_2$ and $R_6$ are selected such that at least one hydrophobic and at least one hydrophilic moiety are present in the polyaspartate derivative.

5. A method for making a polyaspartate derivative comprising the step of mixing a polysuccinimide or a source of polysuccinimide with a primary or secondary amine material that is hydrophobic or that can subsequently be modified to be hydrophobic and a primary or secondary amine material that is hydrophilic or that can subsequently be modified to be hydrophilic to produce a polyaspartate derivative which is hydrophobically and hydrophilically modified.

6. A polyaspartate derivative made by the method according to claim 5.

7. A detergent composition comprising a polyaspartate derivative according to claim 1.

8. A laundry detergent composition comprising:
(a) from about 1% to about 80% by wt of at least one anionic, nonionic, cationic, ampholytic, or zwitterionic surfactant and mixtures thereof;
(b) from about 0.001% to about 50% by wt of a polyaspartate derivativeof claim 1; and
(c) the balance adjunct ingredients.

9. The polyaspartate derivative according to claim 1, wherein the hydrophilic moiety is selected from the group consisting of: H, saccharide, sulfoalkyl, disulfoalkyl, sulfoaryl, sulfinoalkyl, alkyl substituted with both sulfonate and sulfinate groups, —$((CH_2)_{1-18}O)_{0-1}$—$(CH_2CH(R_3)O)_{1-50}$—$R_4$; wherein $R_4$ is H, saccharide, sulfoalkyl, disulfoalkyl, sulfoaryl, sulfinoalkyl, alkyl substituted with both sulfonate and sulfinate groups, —$(CH_2)_{1-18}$—$(OCH_2CH(R_3))_{0-40}$—$NR_5R_6$; wherein $R_5$ and $R_6$ are selected from the group consisting of H, or saccharide, sulfoalkyl, disulfoalkyl, sulfoaryl, sulfinoalkyl, alkyl substituted with both sulfonate and sulfinate groups, —$(CH_2)_{1-18}$—$(OCH_2CH(R_3))_{0-40}$—$NR_5R_6R_7$; wherein $R_5$, $R_6$ and $R_7$ are selected from the group consisting of H, or saccharide, or sulfoalkyl, disulfoalkyl, sulfoaryl, sulfinoalkyl, alkyl substituted with both sulfonate and sulfinate groups and mixtures thereof.

10. The polyaspartate derivative according to claim 1 wherein the hydrophobic moiety is selected from the group consisting of: $C_2$–$C_{22}$ linear or branched alkyl, $C_2$–$C_{22}$ unsaturated alkyl, $C_6$–$C_{12}$ aryl, $C_7$–$C_{24}$ aralkyl or alkaryl, —$(CH_2)_{1-18}$—$(OCH_2CH(R_3))_{0-40}$—$NR_4R_6$; wherein $R_4$ and $R_6$ are $C_1$–$C_{18}$ alkyl, $C_6$–$C_{12}$ aryl, $C_7$–$C_{24}$ alkaryl or aralkyl, or —$(CH_2)_{1-18}$—$(OCH_2CH(R_3))_{0-40}$—$NR_5R_6R_7$; wherein $R_5$, and $R_6$ and $R_7$ are $C_1$–$C_{18}$ alkyl, $C_6$–$C_{12}$ aryl, $C_7$–$C_{24}$ alkaryl or aralkyl, —$(CH_2)_5$— or —$(CH_2)_2$—O—$(CH_2)_2$— group, and mixture thereof.

11. The polyaspartate derivative according to claim 9 wherein $R_1$ or $R_2$ is selected as a hydrophilic moiety with the other being selected as H.

12. The polyaspartate derivative according to claim 10 wherein $R_1$ or $R_2$ is selected as a hydrophobic moiety with the other being selected as H.

13. The method of claim 5 wherein the primary or secondary amine material as selected from the group consisting of dimethyl formimide, alkoxylated monoamines, alkoxylated diamines, benzylamine, ethoxyethoxyethoxypropylamine, 3-dimethylaminopropylamine, and mixtures thereof.

* * * * *